Figure 4:
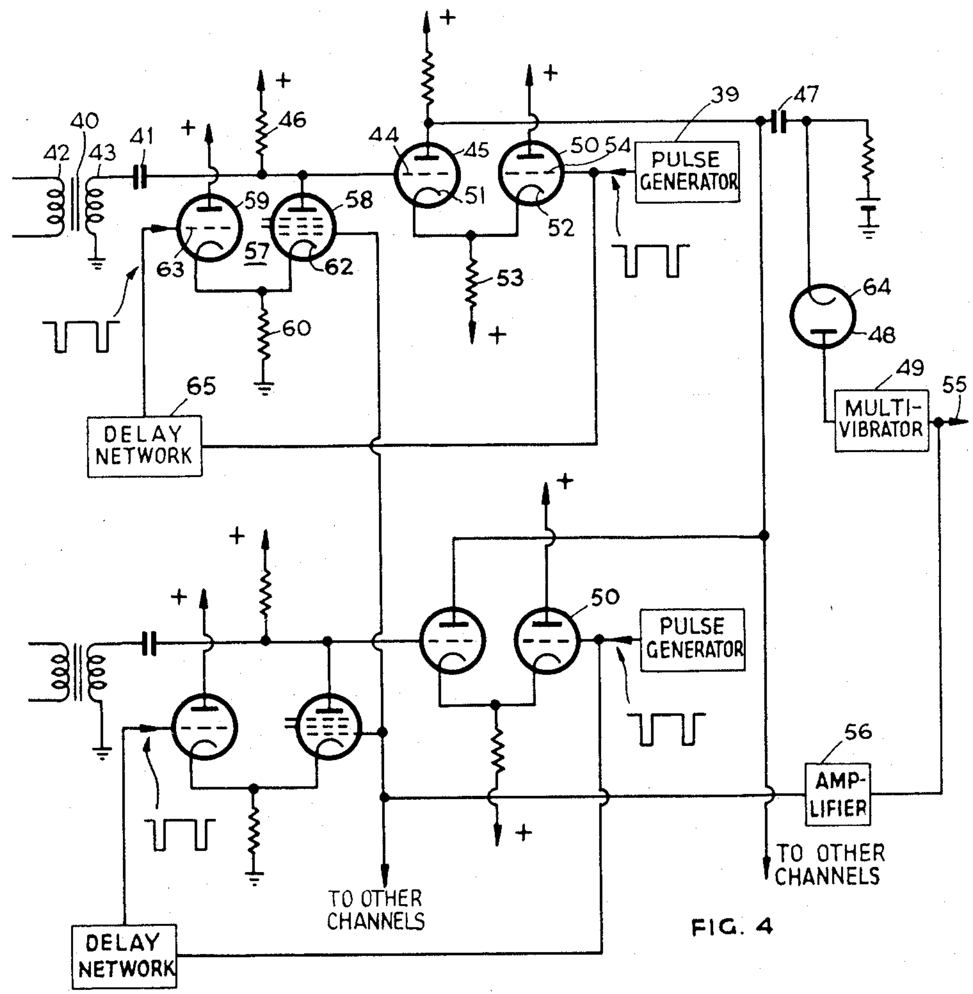

PULSE MODULATION SIGNALLING SYSTEMS
Filed Sept. 18, 1951 3 Sheets-Sheet 1
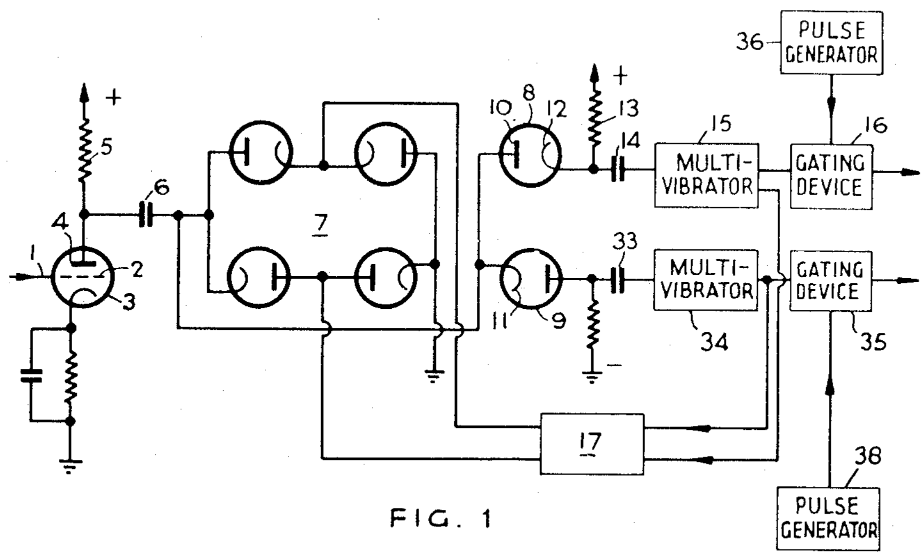
FIG. 1
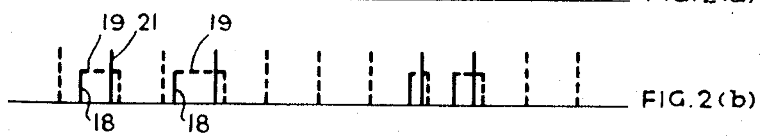
FIG. 2(a)
FIG. 2(b)
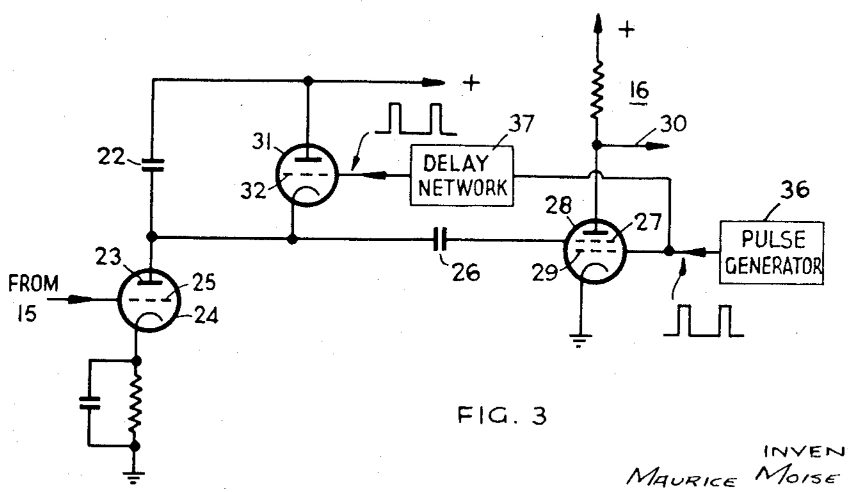
FIG. 3
INVENTOR
MAURICE MOISE LEVY
BY
[signature]
ATTORNEY INVENTOR
Maurice Moise Levy
BY [signature]
ATTORNEY

PULSE MODULATION SIGNALLING SYSTEMS

Filed Sept. 18, 1951

INVENTOR
MAURICE MOISE LEVY
BY [signature]
ATTORNEY

United States Patent Office 2,721,308

Patented Oct. 18, 1955

1

2,721,308

PULSE MODULATION SIGNALLING SYSTEMS

Maurice Moise Levy, Ottawa, Ontario, Canada, assignor to The General Electric Company Limited, London, England Application September 18, 1951, Serial No. 247,071

Claims priority, application Great Britain September 28, 1950

9 Claims. (Cl. 332—11)

The present invention relates to pulse modulation signalling systems.

In pulse signalling systems it is known to transmit a signal, for example an audio signal, by periodically sampling the signal and transmitting a pulse code signal identifying the quantized amplitude of the sample which may be any level over a range of levels. This quantized amplitude is one of a number of predetermined amplitude levels which approximates the amplitude of the sample. The pulse code signal sent in respect to each such sample may consist of a small number, say five, pulse intervals, the necessary information being transmitted by the presence or absence of a pulse in each of these intervals, so that with five such intervals the maximum number of different amplitudes that can be sent is thirty-two. The sampling is effected at a predetermined frequency and information is therefore transmitted defining the approximate amplitude of the signal at regularly recurring instances.

One object of the present invention is to provide an improved pulse modulation signalling system and more particularly to provide a novel form of apparatus for generating pulse modulation signals in such a system.

According to the present invention, apparatus for generating a pulse modulation signal comprises means for comparing the amplitude level of the signal to be converted into the pulse modulation signal and a reference level which may vary in a known manner with respect to time, means for determining when the difference between these two levels exceeds a predetermined value, means for producing at periodically recurring instances and in dependence upon the information supplied by the last mentioned means an element of a pulse modulation signal defining whether or not the said difference has exceeded the predetermined value, and means for changing the reference level in dependence upon an element of the pulse modulation signal being produced to indicate that the said difference has exceeded the said predetermined value whereby the difference is reduced to a further predetermined value which may be zero.

The element of the pulse modulation signal produced at each interval may be either a pulse or no pulse corresponding, but not necessarily respectively, to the two conditions that the said difference has and has not exceeded the predetermined value.

The resulting pulse modulation signal thus represents approximately the change in the signal level between successive instances which recur at a predetermined frequency. The comparison of the signal level and the reference level may be made continuously in which case it is necessary to store the information that the incremental difference has been exceeded until the next instant for producing the appropriate pulse signal element. Alternately the comparison may only be made periodically, that is to say at regularly recurrent instances, but in either case, it will be appreciated that no sampling is necessary.

The apparatus may be adapted to generate two such pulse modulation signals in like manner, one of these signals carrying information of incremental changes in the signal level above said reference level and the other carrying information of incremental changes below the reference level. The reference level may then have a constant value with respect to time, that is to say, the reference level does not change until such time as an element of a pulse modulation signal is produced to indicate that the signal level is more than the predetermined increment above or below the reference level.

Alternatively, the reference level may increase or decrease at a predetermined rate and in that case only a single pulse modulation signal need be produced, say in respect of increases in signal level above the reference level. The decay in the reference level then takes care of decreases in the signal level during which time the pulse modulation signal merely indicates that the said difference does not exceed the predetermined value.

In addition to defining whether or not the difference between the signal level and the reference level has exceeded the predetermined value, each element of the pulse modulation signal may indicate the number of increments of predetermined amplitude in the difference between the signal level and the reference level, that is to say the quantized difference, the predetermined value of difference corresponding to the first increment. If the pulse element consists of a single pulse interval in which there may or may not be a single pulse, the quantized difference may be indicated by the amplitude of the pulse.

Figure 5:
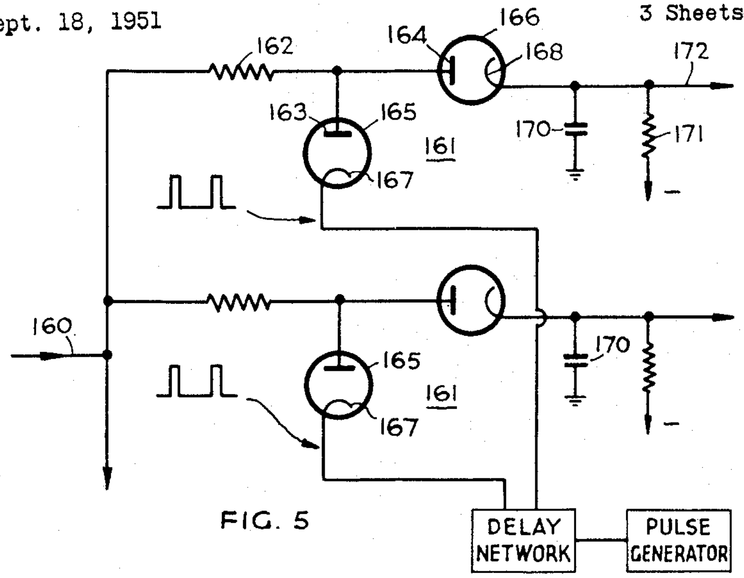
Figure 6:
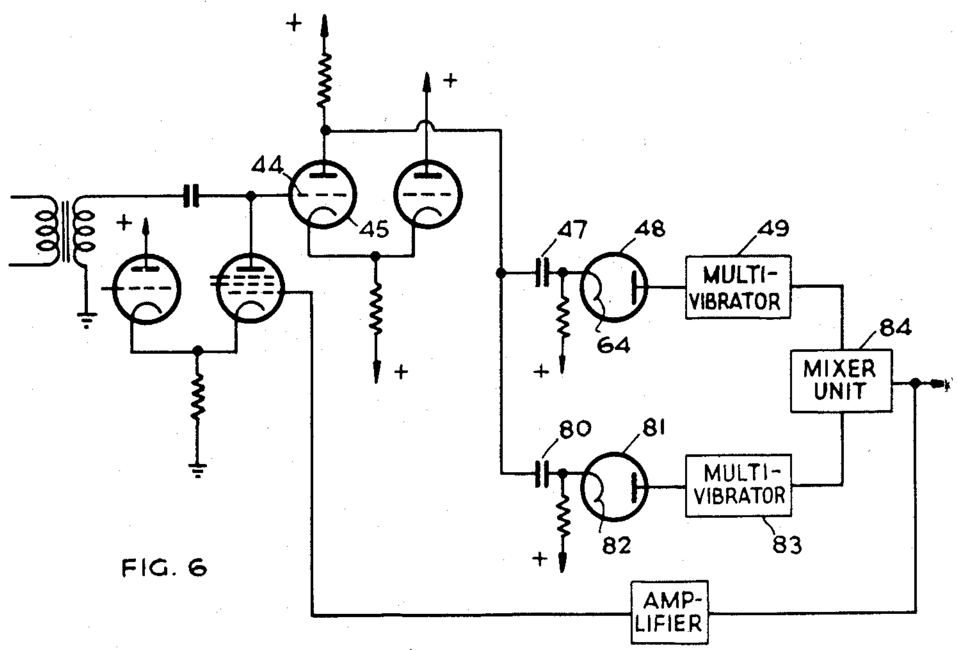
Figure 7:
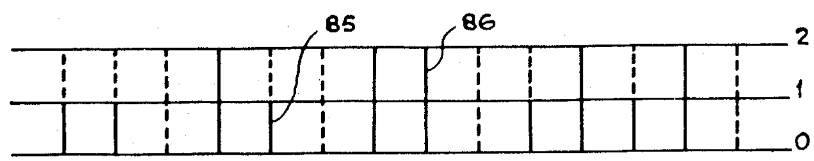

Arrangements of pulse generating apparatus in accordance with the present invention will now be described by way of example with reference to the seven figures of the accompanying drawings in which Figure 1 shows diagrammatically one form of pulse generating apparatus, Figure 2 shows certain wave-forms produced in the apparatus of Figure 1, Figure 3 shows in more detail part of the circuit of the apparatus of Figure 1, Figure 4 shows diagrammatically another form of apparatus for generating a time multiplex signal in respect of a plurality of input signals, Figure 5 shows part of apparatus for demodulating the signal produced by the apparatus of Figure 4, Figure 6 shows diagrammatically another form of pulse generating apparatus, and Figure 7 shows a typical waveform of the pulse signal generated by the apparatus of Figure 6.

Referring now to Figure 1, the signal to be transmitted is fed over a path 1 to the control grid 2 of a thermionic valve 3. The anode 4 of this valve 3 is connected to a point of positive potential through a resistor 5 and is also connected through a condenser 6 to a pair of diode valves 8 and 9. The two diode valves 8 and 9 are arranged in parallel paths, the anode 10 of the valve 8 and the cathode 11 of the valve 9 being connected to one side of the condenser 6. In addition a clamping network 7 is connected between earth and the junction of the condenser 6 and the diodes 8 and 9.

Considering now only the path containing the diode valve 8, the cathode 12 of this valve is connected to a point of positive potential through a resistor 13. During operation the clamping network 7, which is formed by four diode valves connected as a bridge network, normally presents a high impedance between the condenser 6 and earth and if the signal level supplied to the valve 3 remains constant the arrangement is such that the valve 8 is non-conducting. When however, there is a rise in the potential of the anode 4 due to a fall in the signal level fed over the path 1, it will be appreciated that the valve 8 will momentarily become conducting as soon as the difference between this potential and the reference potential across the condenser 6 exceeds a value which is determined by the potential supplied to the cathode 12 of the diode valve 8.

The pulse developed across the resistor 13 when the diode 8 conducts is fed through a condenser 14 to a multivibrator 15 which is arranged to have one stable and one unstable condition of operation. The effect of supplying a pulse to the multivibrator 15 is to trigger it from the stable to the unstable condition and thereby produce a pulse of relatively short duration, but which is longer than the trigger pulse, and at the end of this pulse the multivibrator 15 has returned to its stable condition. The pulses supplied by the multivibrator 15 are of substantially constant amplitude, whereas the amplitude of the triggering pulses may vary, and are arranged, as hereinafter described to be stored by charging a condenser (not shown in Figure 1). The potential across this condenser is fed to a gating device 16 and also to a device 17. A gating signal having a waveform of periodically recurring pulses is fed from a generator 36 to the gating device 16 so that, if a pulse has been supplied by the multivibrator 15, a pulse occurs in the output from the gating device 16 at an interval determined by the gating signal. The device 17 is arranged so that after a pulse has been supplied by the multivibrator 15 the clamping network 7 is rendered conducting for a short period so that the side of the condenser 6 which is connected to the valve 8 is earthed and the potential across the condenser 6 is brought to the potential of the anode 4. For this purpose the device 17 generates a voltage in dependence upon receipt of such a pulse from the multivibrator 15 and this voltage is fed to the network 7 so as to cause all four valves of that network to conduct.

The operation of this arrangement will be more fully understood with reference to Figure 2 of the accompanying drawings. Figure 2($a$) shows a waveform of the gating signal supplied to the gating device 16. In Figure 2($b$) the pulses 18 represent the instances at which the diode valve 8 becomes conducting, that is to say when the difference between the signal level and the reference level exceeds the predetermined increment. These pulses 18 trigger the multivibrator 15 to produce pulses which charge the storage condenser to the potential shown by the dotted line 19. The potential 19 is stored slightly beyond the instance of the next gating pulse 20 (it is in fact only necessary for the potential 19 to be stored until the occurrence of the next gating pulse 20) and accordingly a pulse 21 is supplied by the gating device 16. It will be appreciated therefore, that the pulses 21 are produced at predetermined intervals of time, the intervals when no such pulse is produced are shown dotted in Figure 2($b$). The storage condenser is arranged to be discharged as soon as its stored information has been used to produce an output pulse from the gating device 16 so as to be ready to store the next pulse from the multivibrator 15.

One arrangement of the gating device 16 and its associated circuit is shown in Figure 3. In this arrangement, a condenser 22 (which is the previously mentioned storage condenser) is connected between a source of positive potential and the anode 23 of a triode thermionic valve 24, to the grid 25 of which is supplied the pulses produced by the multivibrator 15. Thus, when such a pulse is supplied to the valve 24 there is a flow of current through the valve to charge the condenser 22. The junction of the condenser 22 and anode 23 is connected through a condenser 26 to a control grid 27 of a thermionic valve 28. The valve 28 however, is normally cut off by the negative bias on the control grid 29 to which is supplied the gating signal from the generator 36 but, as soon as a positive-going gating pulse is supplied to the grid 29, a pulse is supplied over the path 30 from the gating device 16. A further triode valve 31 is connected across the storage condenser 22 and this valve 31 is normally biased to be non-conducting. The gating signal is, however, applied to the grid 32 of the valve 31 so that periodically the valve 31 is rendered conducting and the condenser 22 is discharged. In order that the required output pulse may be supplied by the gating device 16 before the condenser 22 is discharged, the gating signal supplied to the valve 31 may be delayed (as shown) by being passed through a delay network 37.

In a similar manner the diode valve 9 (in Figure 1) is arranged to feed positive-going pulses through a condenser 33 to a multi-vibrator 34 when the signal level falls below the reference level by a predetermined increment. The output of the multi-vibrator 34 is supplied to a gating device 35 and also to the device 17, and a gating signal is also supplied to the gating device 35. It will be appreciated therefore, that the apparatus supplies two pulse signals which define when the level of the signal to be transmitted falls below or rises above the reference level and that these pulses occur at instances determined by the gating signals supplied to the gating devices 16 and 35. In order to be transmitted as a single singal these two pulse signals may be combined in a multiplex in any known manner. For example, they may be combined in a time multiplex merely by adding the outputs from the gating devices 16 and 35 and arranging the gating signals supplied to those two devices to be such that they are open at different instances.

At the receiving end of the pulse signalling system, the two pulse signals are utilised to control the feeding of positive and negative increments respectively to an integrating circuit which thus approximately reproduces the signal being transmitted.

The second arrangement in accordance with the invention is of apparatus for producing a single pulse modulation signal carrying in time-division multiplex the signal information of a plurality of channels. Referring now to Figure 4, each channel has an associated transformer 40 to the primary winding 42 of which is fed the channel signal and a reference condenser 41 is connected between the secondary winding 43 and a control grid 44 of a valve 45. The voltage fed to the grid 44 is thus dependent upon the difference between the reference potential across the condenser 41 and that across the secondary winding 43. In addition the side of the condenser 41 which is connected to the grid 44 is also connected to a source of positive potential through a resistor 46 so that the condenser 41 tends to become charged due to the flow of current through the resistor 46 with the result that the potential of the grid 44 tends to increase. As in the previous arrangement, the anode potential of this valve 45 is fed through a condenser 47 and a diode valve 48 to a multivibrator 49 which has one stable and one unstable condition. The cathode 64 of the valve 48 is connected to the condenser 47 and is positively biased to render the valve normally non-conducting.

The valve 45 in this arrangement is gated by means of a further valve 50, the valves 45 and 50 having their cathodes 51 and 52 connected through a common cathode resistor 53 to a source of positive potential. A gating signal containing negative-going pulses is fed from a pulse generator 39 to the grid 54 of the valve 50 so that, in the absence of such pulses, that valve is normally conducting and the valve 45 is biased beyond cut-off. When however a negative-going pulse is fed to the grid 54, the valve 50 is cut off and the valve 45 is rendered conducting for a short interval so that, if the grid 44 during that interval has a potential above a certain value determined by the circuit parameters, the diode valve 48 will momentarily conduct and the multivibrator 49 will be triggered to its unstable condition so as to produce a pulse at that instant.

The multivibrator 49 provides the required pulse modulation signal over the path 55 and this signal is also fed through an amplifier 56 to a clamping network 57. The network 57 comprises two thermionic valves 58 and 59 which have a common cathode resistor 60. The anode 61 of the valve 58 is connected to the grid 44 of the valve 45 and the amplified output pulse signal is fed to the grid 62 of the valve 58. A gating signal containing negative-going gating pulses obtained from the generator 39 through a delay network 65 is fed to the grid 63 of the valve 59 and the arrangement is such that the valve 58 is only conducting during the occurrence of such gating pulses when a positive-going pulse is also supplied by the amplifier 56 in dependence upon a pulse being produced in the output signal. Thus under these conditions the potential on the grid 44 is clamped to a particular value and the potential across the condenser 41 is reduced accordingly.

During operation of this arrangement, the condenser 41 is continuously being charged through the resistor 46 so that, due to this effect alone, the potential on the grid 44 tends to rise and the anode potential of the valve 45 to fall at successive instances when gating pulses are fed to the valve 50. If therefore there is no input signal, the anode potential will eventually fall to such a value during a gating instance that the bias is overcome and the diode valve 48 momentarily becomes conducting and one output pulse is produced on the path 55 whereupon the grid 44 is clamped back to its previous level. If now the input signal is itself increasing in level, this will be signalled by an increase in the number of output pulses produced although it will be appreciated that the instances at which these pulses can occur is determined solely by the gating signal supplied to the valve 50. Similarly a decrease in the signal level results in a decrease in the number of pulses. Since no information can be signalled if the potential of the grid 44 falls below the level to which it is clamped by the network 57, it will be realised that the highest signal frequency that can be dealt with by the apparatus is determined inter alia by the rate of charging the condenser 41 through the resistor 46.

In order to produce a multi-channel pulse modulation signal, the equipment described above before the condenser 47 is reproduced for each channel. The equipment for only two channels is shown in Figure 4. The gating signals fed to the valves 50 associated with the several channels are phased so that only information in respect of one channel is passed through the condenser 47 to the diode valve 48 at any instant. In order to effect this phasing, instead of providing each channel with an associated pulse generator, all the gating signals may be taken from tappings on a delay network which is supplied from the single generator 39. The output signal is thus made up of a time multiplex of the pulse modulation signals in respect of the several channels. Although this multiplex signal is fed through the amplifier 56, the pulses in respect of other channels have no effect on the clamping network 57 of a channel since it is made operative only when a pulse occurs simultaneously in the multiplex signal and in the gating signal fed to the valve 59 of that channel.

In the arrangement described above, the multivibrator 49 must have a very high speed of operation at least equal to the recurrence rate of the pulse intervals in the multiplex signal. This speed of operation may be reduced by providing, for example, two multivibrators which each deal with half the channels. In such an arrangement, if alternate channels in the final multiplex are dealt with by one multivibrator and the remaining channels by the other multivibrator, the speed of operation is halved, the outputs from the two multivibrators being added to produce the final multiplex signal.

Referring now to Figure 5, at the receiving end the multiplex signal as produced above, is fed, if necessary after reshaping the pulses, over a path 160 to gating circuits 161 associated one with each channel. Each gating circuit 161 comprises a resistor 162 over which the multiplex signal is fed to the anodes 163 and 164 of a pair of diode valves 165 and 166. A gating signal having positive-going pulses is fed to the cathode 167 of the valve 165 so that this valve is normally conducting and thus bypasses the multiplex signal except when a gating pulse is fed to the cathode 167. A condenser 170 is connected between the cathode 168 of the diode valve 166 and the junction of the condenser 170 and the cathode 168 is connected to a source of negative potential through a resistor 171. Thus, during operation, the potential on the output path 172 of a channel tends to fall. When however a positive-going pulse is fed over the path 160 in the correct interval of time, when the valve 165 associated with that channel is non-conducting, the valve 166 conducts and a quantum of current is fed to the condenser 170 so as to raise the potential on the path 172. By suitable choice of the values of the components in this arrangement, the signal on the output path can be made approximately to follow the input signal. The gating signals fed to the cathodes 167 of the valves 65 associated with the several channels are obtained from tapping points on a delay network 173 which is supplied from a generator 174 and these signals are phased so that pulses in successive pulse intervals in the multiplex signal are fed through the gating circuits 161 in turn to the appropriate integrating condenser 170.

The signalling system described above with reference to Figures 4 and 5 may be used for transmitting the signals on a plurality of audio frequency channels, in which case the gating frequency of each channel would be approximately four times the maximum audio frequency to be transmitted, or higher. Alternatively it may be used for telemetering in which it is required only to send one quantum of information in respect of the signal level on each of a plurality of channels, say ten, every two or three seconds.

In the arrangement described with reference to Figure 4, a pulse is transmitted when the potential on the grid 44 of the valve 45 exceeds the clamping level by a predetermined increment. The arrangement may be modified, as shown in respect of a single channel in Figure 6, so that more than one incremental change can be signalled, the integral number of such increments being used to amplitude modulate the output pulse. In this case the signal from the valve 45 (using the same notation as in Figure 4) is fed through the condenser 47 to the diode valve 48 and also through a condenser 80 to another diode valve 81. The cathode 82 is biased more positively than the cathode 64 so that the valve 81 is caused momentarily to conduct only when the increase in the potential of the grid 44 above the clamping level is twice that necessary to cause the valve 48 to conduct. A multi-vibrator 83 is triggered by the valve 81 conducting and the output from the multivibrators 49 and 83 are fed to a mixer unit 84 to produce a pulse modulation signal which may have a waveform as shown in Figure 7, the shorter pulses 85 being produced when only the multivibrator 49 is triggered and the longer pulses 86 when the multivibrator 83 is triggered. In either case the clamping network 57 is operated to restore the potential of the grid 44 of the valve 45.

I claim:

1. Apparatus for generating a pulse modulation signal from an input signal comprising means for supplying a reference level which may vary in known manner with respect to time, means for comparing the amplitude level of the input signal and the reference level, means for determining when the difference between these two levels exceeds a predetermined value, means for producing at periodically recurring instances and in dependence upon the information supplied by the last mentioned means an element of a pulse modulation signal defining whether or not the said difference has exceeded the predetermined value, and means for changing the reference level upon an element of the pulse modulation signal being produced to indicate that the said difference has exceeded the said predetermined value whereby the difference is then reduced to a further predetermined value which may be zero.

2. Apparatus according to claim 1 wherein the first-mentioned means is adapted continuously to compare the signal level and the reference level, there being means to store the information that the difference between these levels exceeds the predetermined value until the next instant for producing the appropriate element of the pulse modulation signal.

3. Apparatus according to claim 2 wherein the said means for storing the information that the difference between the signal level and the reference level has exceeded the predetermined value comprises a two-condition multi-vibrator while the said means for producing the pulse elements comprises a gating device which is adapted to gate the multi-vibrator output at regularly recurrent instants.

4. Apparatus according to claim 1 wherein the first-mentioned means is adapted periodically to compare the signal and the reference level.

5. Apparatus according to claim 1 and which is adapted to generate two such pulse modulation signals in like manner, one of these signals carrying information of incremental changes in the signal level above said reference level and the other carrying information of incremental changes below the reference level.

6. Apparatus according to claim 5 and which is arranged so that the said reference level has a constant value with respect to time and is only changed when an element of either of the pulse modulation signals is produced.

7. Apparatus according to claim 1 and which is arranged so that the said reference level changes at a predetermined rate.

8. Apparatus according to claim 1 wherein the said means for producing the pulse elements is adapted so that the pulse elements produced thereby, in addition to defining whether or not the difference between the signal level and the reference level has exceeded the predetermined value indicate the number of increments of predetermined amplitude in the said difference.

9. Apparatus according to claim 8 and in which each pulse element may consist selectively of either a single pulse or no pulse in a single pulse interval in a pulse moduation signal, wherein the amplitude of each such pulse indicates the quantized difference between the signal level and the reference level.

References Cited in the file of this patent

UNITED STATES PATENTS

| | | |
|---|---|---|
| 2,539,623 | Heising | Jan. 30, 1951 |
| 2,568,724 | Earp | Sept. 25, 1951 |
| 2,592,061 | Oxford | Apr. 8, 1952 |
| 2,596,199 | Bennett | May 13, 1952 |
| 2,605,361 | Cutler | July 29, 1952 |